US012681162B2

(12) United States Patent
Matskevych et al.

(10) Patent No.: US 12,681,162 B2
(45) Date of Patent: Jul. 14, 2026

(54) METHOD, COMPUTER PROGRAM, STORAGE MEDIUM, DEVICE FOR TRACKING AN OBJECT

(71) Applicant: Robert Bosch GmbH, Stuttgart (DE)

(72) Inventors: Alex Matskevych, Heidelberg (DE); Thomas Gumpp, Dillingen (DE); Alexandru Paul Condurache, Renningen (DE); Claudius Glaeser, Ditzingen (DE); Jasmin Ebert, Heidelberg (DE); Sebastian Muenzner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 18/245,105

(22) PCT Filed: Sep. 15, 2021

(86) PCT No.: PCT/EP2021/075287
§ 371 (c)(1),
(2) Date: Mar. 13, 2023

(87) PCT Pub. No.: WO2022/058331
PCT Pub. Date: Mar. 24, 2022

(65) Prior Publication Data
US 2023/0358877 A1 Nov. 9, 2023

(30) Foreign Application Priority Data
Sep. 16, 2020 (DE) .................... 10 2020 211 590.7

(51) Int. Cl.
*G01S 13/72* (2006.01)
*G01S 7/41* (2006.01)
*G01S 13/931* (2020.01)

(52) U.S. Cl.
CPC .............. *G01S 13/72* (2013.01); *G01S 7/417* (2013.01); *G01S 13/931* (2013.01)

(58) Field of Classification Search
CPC ......... G01S 13/72; G01S 7/417; G01S 13/931
See application file for complete search history.

(56) References Cited

U.S. PATENT DOCUMENTS 10,520,904 B2 * 12/2019 Mercep ................ G05D 1/0255
10,732,261 B1 * 8/2020 Wang ...................... G01S 7/417
(Continued)

FOREIGN PATENT DOCUMENTS

DE 10 2010 029 637 A1 12/2011

OTHER PUBLICATIONS

International Search Report corresponding to PCT Application No. PCT/EP2021/075287, mailed Jan. 5, 2022 (German and English language document) (6 pages).
(Continued)

*Primary Examiner* — Nazra Nur Waheed
(74) *Attorney, Agent, or Firm* — Maginot, Moore & Beck LLP

(57) ABSTRACT

A method is for tracking an object using an environment sensor. The object is represented by an object status. The method includes detecting a sensor value of the environment sensor, predicting a future object status of the object, and updating the object status using a Bayesian filter. The updating includes using an artificial intelligence module ("AI module"). The AI module is trained such that the detected sensor value is associated with the object and the object status of the object is updated based on the predicted future object status of the object and the detected sensor value.

7 Claims, 2 Drawing Sheets

(56) References Cited

U.S. PATENT DOCUMENTS

| | | | |
|---|---|---|---|
| 11,300,663 B2 * | 4/2022 | Wuthishuwong | ..... G01S 17/931 |
| 2020/0082248 A1 * | 3/2020 | Villegas | ................. G06N 3/044 |
| 2020/0201359 A1 * | 6/2020 | Burghardt | ......... G01C 21/1654 |
| 2020/0379461 A1 * | 12/2020 | Singh | ............. B60W 60/00276 |

OTHER PUBLICATIONS

Grob et al., "AlignNet-3D: Fast Point Cloud Registration of Partially Observed Objects", 2019 International Conference on 3D Vision (3DV), IEEE, Sep. 16, 2019, pp. 623-632, XP033653301 (10 pages).

Qi et al., "PointNet: Deep Learning on Point Sets for 3D Classification and Segmentation", 2017 International Conference on Computer Vision and Pattern Recognition, IEEE, Apr. 10, 2017, pp. 652-660 (19 bages).

Feng et al., "Leveraging Heteroscedastic Aleatoric Uncertainties for Robust Real-Time LiDAR 3D Object Detection", IEEE Intelligent Vehicles Symposium, May 5, 2019, pp. 1280-1287 (8 pages).

* cited by examiner

METHOD, COMPUTER PROGRAM, STORAGE MEDIUM, DEVICE FOR TRACKING AN OBJECT

This application is a 35 U.S.C. § 371 National Stage Application of PCT/EP2021/075287, filed on Sep. 15, 2021, which claims the benefit of priority to Serial No. DE 10 2020 211 590.7, filed on Sep. 16, 2020 in Germany, the disclosures of which are incorporated herein by reference in their entirety.

In a first aspect, the disclosure relates to a method for tracking an object. In further aspects, the disclosure relates to corresponding computer programs, storage media and devices.

BACKGROUND

DE 10 2010 029 637 A1 discloses a method for object tracking in a locating system with a wave emitter and a wave sensor. The method comprises the below steps:

measuring a first distance and a first speed of an object in a first measurement cycle by virtue of waves being emitted by means of the wave emitter and waves reflected by the object being detected by means of the wave sensor, calculating a predicted distance and a predicted speed of the object for a second measurement cycle by performing Kalman filtering based on the first speed and the first distance, with a movement model in spherical sensor coordinates and an auxiliary variable being used for the Kalman filtering.

SUMMARY

Tracking an object, or object tracking, can be understood in the present case to mean a field of technology that aims to identify a quantity of objects on the basis of sensor values from environment sensors and to deduce an object status for each object, to associate the sensor values with identifying objects and to update the object status continuously on the basis of new sensor values.

Object tracking in the automotive field has the inherent problem that typically broad objects, usually vehicles, are to be tracked primarily on the basis of the signals from an environment sensor system. It is an objective in this case to assign the received sensor signals to an object (step of associating). Sensor models, inter alia, are used for this purpose.

In particular, the creation of an appropriate sensor model has hitherto been very complex.

Therefore, the aim of the disclosure is to train a sensor measurement model, i.e., to use substantially a corresponding AI module, the use of which allows the predicted object status to be corrected on the basis of the detected sensor signals.

Against this background, the disclosure provides in a first aspect a method for tracking an object by means of an environment sensor.

An environment sensor can be understood in the present case to mean a sensor or a sensor system that detects waves, in particular electromagnetic waves, and optionally emits corresponding waves. Typical environment sensors are video, radar, ultrasound, infrared and lidar sensors.

In the automotive field, one field of application for the technology of object tracking is driver assistance systems for longitudinal and lateral control, which is known as adaptive cruise control, (ACC).

For this purpose, the method of the disclosure has the following typical steps of a method for object tracking by means of a Kalman filter:

Detecting a sensor value of the environment sensor.

Predicting a future object status of the object.

Updating the object status.

The steps of predicting and updating typically run as part of processing within a Bayesian filter, in particular within a Kalman filter, in particular an extended Kalman filter.

The method of the disclosure is characterized in that an AI module is used in the step of updating. The AI module is trained in such a way that the detected sensor value is associated with the object and the object status of the object is updated on the basis of the future object status of the object and the detected sensor value.

The disclosure is based on the knowledge that an AI module can be trained on sensor measurement models in such a way that detected sensor values are associated with a tracked object and the object status of the tracked object is updated. The trained sensor measurement model solves the problem of initially associating the detected sensor measurement values in the sensor measurement space with the tracked object and then updating the object status of the tracked object in the object status space by means of the associated sensor measurement values, the object status space typically being different from the sensor measurement space.

The trained AI module can be understood as a type of virtual sensor which maps measurement values from the measurement space into an abstract dimension. The abstract dimension should be related to the object status space. It is advantageous if the abstract dimension coincides with the object status space.

If m is the trained model and $z_k$ is the detected sensor measurement values, the following then applies to virtual sensor measurement $$z_k^{DNN}:$$

$$z_k^{DNN} = m(z_k)$$

This model can easily be used in the known updating step of an object tracker with a Bayesian filter, in particular with a Kalman filter:

$$x_k = x_k^- + K_k\big(z_k^{DNN} - h^{meta}(x_k^-, v_k)\big)$$

Alternatively, the correction between the predicted object status $$x_k^-$$

and the detected sensor measurement values $z_k$ can be directly learned. For this purpose, let m be the trained model:

$$m(z_k, x_k^-) = z_k - h(x_k^-, v_k)$$

This model can easily be used in the known updating step of an object tracker with a Bayesian filter, in particular with a Kalman filter:

$$x_k = x_k^- + K_k(m(z_k, x_k^-))$$

Here, $x_k$: is the updated object status of the tracked object in the time step k.

$$x_k^- :$$

is the predicted object status of the tracked object for time step k.

$K_k$: is the Kalman gain, which minimizes the a posteriori error covariance and represents a value corresponding to the extent to which the predicted object status $$x_k^-$$

has been adapted on the basis of the sensor measurement values $z_k$ or virtual sensor measurement values $$z_k^{DNN}.$$

$h^{meta}$: is the sensor measurement value function, which maps the object status into the abstract dimension of the virtual sensor measurement values $$z_k^{DNN}.$$

It is advantageous if the abstract dimension of the virtual sensor measurement values coincides with the object status space.

$v_k$: is the sensor measurement noise.

The AI module can be a regression system.

According to an embodiment of the method of the disclosure, the AI module comprises a grid-based artificial neural network.

A grid-based artificial neural network can be understood in the present case to mean a convolutional neural network which operates as an input on a data grid. A grid can be implemented by means of a polar field.

The data grid can represent a predetermined area centered around the tracked object. An area of 10 m to 10 m with a cell size of 0.25 m to 0.25 m in each case has proven to be useful here. A processed subset of the detected environment variables can be applied to the depth of the input grid. When using a radar sensor as an environment sensor, the attributes of radial velocity and the backscatter cross section or backscatter beam area of the radar sensor have proven to be suitable environment variables.

When using a radar sensor as the environment sensor, it has also proven useful, if more than one radar reflection falls into a cell, to consider only the attributes of the strongest reflection. The strength can in this case be determined by means of the attribute of angle quality of the sensor signal.

Alternatively, an average value of the radar reflections or a weighting of the attributes over the angle quality can be used.

An advantage of using a grid-based artificial neural network as the AI module is that the robustness of the method can thereby be increased compared with conventional measurement models, such as "L-shape" or the "closest reflex model". The "closest reflex model" is an association model that uses the closest radar reflection in a distance-based metric.

According to an embodiment of the method of the disclosure, the AI module comprises an artificial neural network which is based on adaptive lists, for example with an architecture derived from T-Net according to C. R. Qi, H. Su, K. Mo, and L. J. Guibas, "Pointnet: Deep learning on point sets for 3d classification and segmentation," in IEEE conference on computer vision and pattern recognition, 2017, pp. 652-660, hereinafter referred to as "Point T-Net".

In this case, the Point T-Net is set up in such a way that, when a radar sensor is used as the environment sensor, the first layers are initially trained independently per radar reflection, and the results thereof are then combined to form a global feature vector which is suitable for representing the entire detected scene.

The network directly learns the prediction of corrections of the object status.

It has also proven to be advantageous to apply the input of the Point T-Net in such a way that the tracked object represents the origin of the coordinate system of the input parameters.

The advantage of using a Point T-Net as the AI module is that, in addition to the increased robustness compared with the conventional models "L-shape" and "closest reflex model", the Point T-Net is also significantly superior to the known methods in terms of accuracy. In addition, the adaptive list input better maps the natural measurement principle of the radar with a different number of reflections.

According to an embodiment of the method of the disclosure, the AI module is trained to map a detected sensor value from the sensor measurement space into the object status space.

According to an embodiment of the method of the disclosure, the measurement noise is derived on the basis of the AI module.

The measurement noise can be derived on the basis of the AI module either offline, i.e., before performing the method, or online, i.e., while the method is being performed.

In the offline case, the derivation takes place by calculating a covariance matrix which can be introduced as measurement noise to the Bayesian filter, in particular the Kalman filter. For the offline case, the artificial neural network m is trained first.

After the neural network m has been fully trained, the data points of the validation set $gt_k$ are classified into the above-mentioned cells. Each data point is given to the trained network by normalization with different prediction errors. Here, noising with 2500 offsets has proven to be useful. Per grid cell, the covariance matrix of the measurement noise is calculated by means of the relationship below. The calculated covariance matrices are stored and used in case of inference.

The covariance matrix is calculated by means of the correspondingly trained AI module. A covariance matrix R can be derived for the measurement noise of the Kalman filter by dividing the scanning field of the sensor into a grid, for example a polar field, and estimating a covariance matrix R for each cell of the field. The estimation is carried out by determining the deviations between the prediction of the AI module $$z_k^{DNN}$$

and the ground truth $gt_k$ according to the following relationship:

$$R_k^{DNN} = Cov\left[z_k^{DNN} - gt_k\right]$$

In the case of the alternative approach for directly determining the difference $$(m(z_k, x_k^-) = z_k - h(x_k^-, v_k))$$

from the AI module, the following similarly applies:

$$R_k^{DNN} = Cov[m(z_k, x_k^-)]$$

The covariance matrices estimated in this way can be incorporated in a simple manner into the Kalman filter according to the following relationship:

$$K_k = P_k^- H_k^T\left(H_k P_k^- H_k^T + V_k R_k^{DNN} V_k^T\right)^{-1}$$

To calculate the covariance matrix, it has proven advantageous to apply the trained AI module to 2500 prediction and measurement situations. Possible prediction situations can, for example, be produced from artificial offsets by noising the ground truth $gt_k$.

The calculated covariance matrices are stored and used in case of inference, i.e., while the method of the disclosure is being performed.

An alternative option for determining the measurement uncertainty is to use the distribution errors after digital signal processing. Since each reflection is characterized by an average value (mean) and a standard deviation, samples can be taken online from the distribution per reflection during the inference step, i.e., while the method is being performed. These samples are supplied to the trained artificial neural network. The measurement noise can be determined from the errors in these samples.

Another alternative embodiment is to determine the measurement noise of the Bayesian filter, in particular of the Kalman filter, directly by using output uncertainties of an artificial neural network. This is already trained in the training step to output network uncertainties. These can be used directly online in the inference step. This embodiment is derived from D. Feng, L. Rosenbaum, F. Timm, and K. Dietmayer, "Leveraging heteroscedastic aleatoric uncertainties for robust real-time lidar 3d object detection," in IEEE Intelligent Vehicles Symposium, 2019, pp. 1280-1287.

Another aspect of the disclosure is the use of a method according to any of the preceding claims in a method for longitudinal and/or lateral control of a motor vehicle.

Another aspect of the disclosure is a computer program configured to carry out all the steps of the method according to the disclosure.

Another aspect of the disclosure is a machine-readable storage medium on which the computer program according to one aspect of the disclosure is stored.

Another aspect of the disclosure is a device configured to carry out all the steps of the method according to the disclosure.

BRIEF DESCRIPTION OF THE DRAWINGS

Embodiments of the disclosure are explained in more detail below with reference to drawings.

In the drawings.

DETAILED DESCRIPTION

Figure 1:
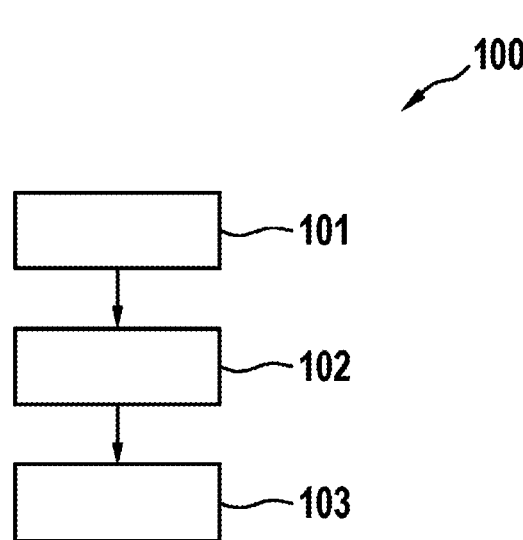
FIG. 1 is a flow chart of an embodiment of the method according to the disclosure.

FIG. 1 shows a flow chart of an embodiment of the method 100 for tracking an object comprising an AI module according to the disclosure.

In step 101, a sensor value of an environment sensor is detected.

In step 102, a future object status of the tracked object is predicted.

In step 103, the object status of the tracked object is updated.

Steps 102 and 103 take place in the Kalman filter.

The method of the disclosure is based on the knowledge of using, for the hitherto conventional steps of associating the detected sensor values with the tracked object and updating the object status of the tracked object, an AI module which is trained in such a way that the detected sensor value is associated with the tracked object and the object status of the tracked object is updated on the basis of the predicted future object status of the object and the detected and associated sensor value.

It is clear that the object status cannot be updated if the detected sensor value cannot be associated with the tracked object.

There may be substantially two reasons for this. Either the detected sensor value has no reference to the tracked object, for example because the sensor value comprises information about a further tracked object ("true negative"). Or the detected sensor value has a reference to the tracked object, but is not associated because the association is too weak and an excessive residual probability remains that the detected sensor value does not have a reference to the tracked object ("false negative").

Figure 2:
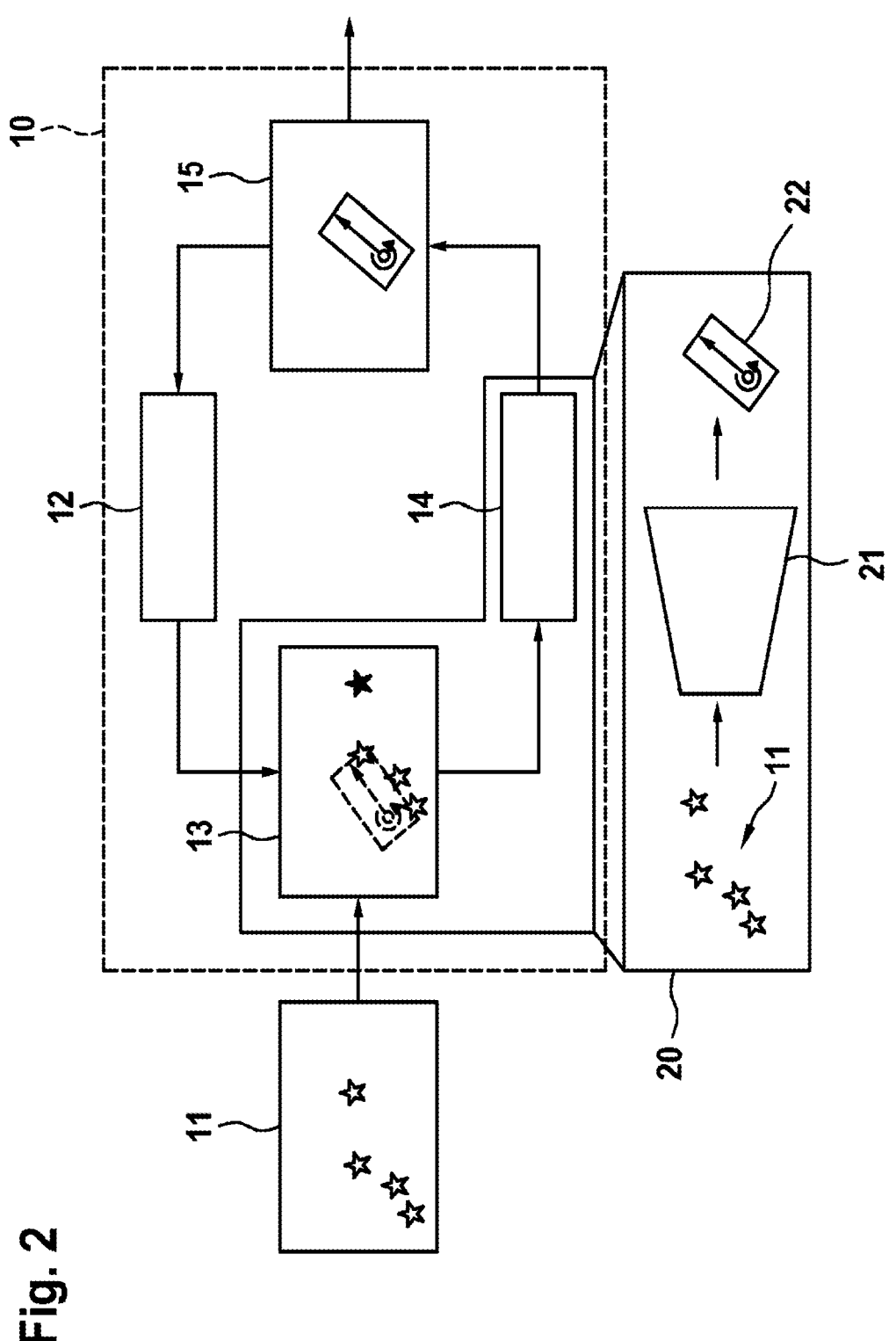
FIG. 2 is a block diagram of a device that implements the method according to the disclosure.

FIG. 2 shows a block diagram of a device that implements the method according to the disclosure.

Block 11 represents the detection of sensor signals by means of an environment sensor (measurement). The stars represent respectively detected signal reflections. An environment sensor is typically understood to mean a sensor or a sensor system that detects waves, in particular electromagnetic waves, and optionally emits corresponding waves. Typical environment sensors are video, radar, ultrasound, infrared and lidar sensors.

The detected sensor signals are fed to a method for object tracking, shown in block 10.

If the object tracking is carried out by means of a Kalman filter, the steps of predicting a future object status (prediction), shown in block 12, associating the sensor signals with a tracked object (association), shown in block 13, updating the object status (update), shown in block 14, and compiling the current list of tracked objects (tracked objects) to be output to a further-processing system such as an adaptive cruise control (ACC) system, shown in block 15, are typically performed cyclically.

The disclosure is based on the knowledge that the step of association 13 and part of the step of updating 14 can be implemented by means of an AI module 21 that receives the detected sensor signals, possibly preprocessed, and, as part of the processing, carries out both the association and the required transformation from the sensor measurement space into the object status space 22.

This characterizing part of the disclosure is shown in block 20.

The invention claimed is:

1. A method for tracking an object using an environment sensor, the object being represented by an object status, the method comprising:

detecting a sensor value of the environment sensor;

predicting a future object status of the object;

updating the object status based on the sensor value and the future object status, the updating including (i) determining a correction using an artificial intelligence module (AI module) that receives the sensor value and the future object status as inputs, and (ii) updating the object status based on the correction using a Bayesian filter; and controlling a longitudinal and/or lateral motion of a motor vehicle based on the updated object status, wherein the AI module is trained such that the detected sensor value is associated with the object, wherein the correction is a difference between the sensor value and the future object status mapped from an object status space into a sensor measurement space.

2. The method according to claim 1, wherein the AI module comprises a grid-based artificial neural network.

3. The method according to claim 1, wherein the AI module comprises an artificial neural network based on adaptive lists.

4. The method according to claim 1, wherein measurement noise is derived based on the AI module.

5. The method according to claim 1, wherein the method is computer-implemented.

6. A non-transitory machine-readable storage medium that stores a computer program that, when executed by a processor, causes the processor to perform the method according to claim 1.

7. A device configured to carry out the method according to claim 1.

* * * * *